US012077323B2

United States Patent
Laurens

(10) Patent No.: US 12,077,323 B2
(45) Date of Patent: Sep. 3, 2024

(54) METHOD FOR ORBIT CONTROL AND DESATURATION OF A SATELLITE BY MEANS OF ARTICULATED ARMS SUPPORTING PROPULSION UNITS

(71) Applicant: AIRBUS DEFENCE AND SPACE SAS, Toulouse (FR)

(72) Inventor: Philippe Laurens, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 18/013,199

(22) PCT Filed: Jun. 28, 2021

(86) PCT No.: PCT/FR2021/051181
§ 371 (c)(1),
(2) Date: Dec. 27, 2022

(87) PCT Pub. No.: WO2022/003284
PCT Pub. Date: Jan. 6, 2022

(65) Prior Publication Data
US 2023/0234723 A1  Jul. 27, 2023

(30) Foreign Application Priority Data
Jul. 2, 2020  (FR) ...................... 2006999

(51) Int. Cl.
*B64G 1/24*   (2006.01)
*B64G 1/26*   (2006.01)
(Continued)

(52) U.S. Cl.
CPC ............ *B64G 1/242* (2013.01); *B64G 1/244* (2019.05); *B64G 1/26* (2013.01); *B64G 1/40* (2013.01); *G05D 1/101* (2013.01)

(58) Field of Classification Search
None
See application file for complete search history.

(56) References Cited

U.S. PATENT DOCUMENTS

| 5,443,231 | A | * | 8/1995 | Anzel | ...................... B64G 1/26 244/164 |
| 5,984,236 | A | * | 11/1999 | Keitel | ...................... B64G 1/26 244/164 |
| 2009/0020650 | A1 | | 1/2009 | Ho | |

FOREIGN PATENT DOCUMENTS

| EP | 0 922 635 | 6/1999 |
| EP | 2 666 723 | 11/2013 |

(Continued)

OTHER PUBLICATIONS

International Search Report for PCT/FR2021/051181 dated Sep. 29, 2021, 6 pages.
(Continued)

*Primary Examiner* — Michael C Zarroli
*Assistant Examiner* — Ka Chun Leung
(74) *Attorney, Agent, or Firm* — Nixon & Vanderhye P.C.

(57) ABSTRACT

A method for orbit control of a satellite in orbit around the Earth and for desaturation of an angular momentum storage device of satellite is disclosed having two articulated arms each supporting a propulsion unit. The method includes determining a maneuver plan having at least two thrust maneuvers, a first thrust maneuver to be executed using the propulsion unit of one of the articulated arms and a second thrust maneuver to be executed using the propulsion unit of the other articulated arm, controlling the articulated arms and the propulsion units according to the maneuver plan, at least one of the first and second thrust maneuvers being a thrust maneuver referred to as discontinuous, composed of at least two separate consecutive thrust sub-maneuvers.

14 Claims, 5 Drawing Sheets

Figure 1:
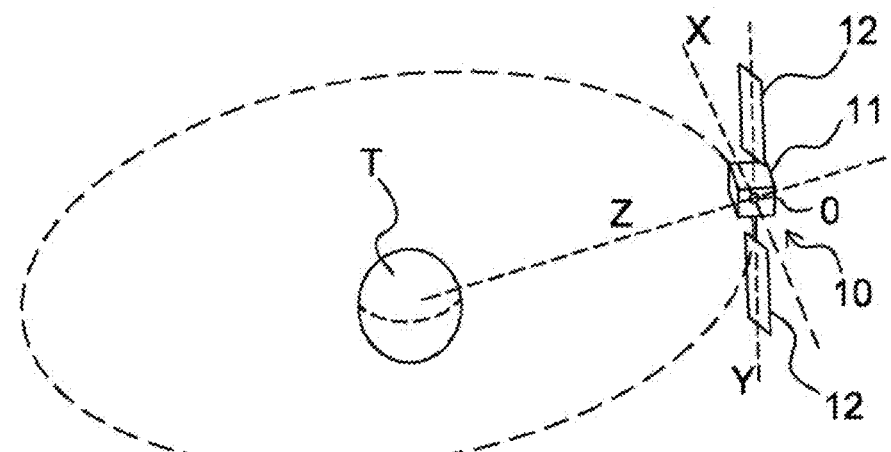

(51) Int. Cl.
B64G 1/40      (2006.01)
G05D 1/00      (2024.01)

(56)          References Cited

FOREIGN PATENT DOCUMENTS

| | | |
|---|---|---|
| EP | 3 157 815 | 4/2017 |
| FR | 2 786 893 | 6/2000 |
| FR | 3 032 427 | 8/2016 |
| WO | 2015/193499 | 12/2015 |

OTHER PUBLICATIONS

Written Opinion of the ISA for PCT/FR2021/051181 dated Sep. 29, 2021, 7 pages.

* cited by examiner

METHOD FOR ORBIT CONTROL AND DESATURATION OF A SATELLITE BY MEANS OF ARTICULATED ARMS SUPPORTING PROPULSION UNITS

CROSS REFERENCE TO RELATED APPLICATIONS

The present application is a National Phase of International Application Number PCT/FR2021/051181 filed Jun. 28, 2021, which designated the U.S. and claims priority benefits from French Application Number FR 2006999 filed Jul. 2, 2020, the entire contents of each of which are hereby incorporated by reference.

TECHNICAL FIELD

The present invention falls within the field of orbit and attitude control of satellites. A particularly advantageous application of the invention, although in no way limiting, is the case of telecommunications satellites in geostationary (or GEO) orbit that are equipped with electric means of propulsion.

STATE OF THE ART

As is known, a satellite in orbit around the Earth is subject to numerous perturbations. These perturbations tend to displace the satellite relative to a set position on its orbit and to modify the attitude of the satellite relative to a set attitude.

In order to maintain the satellite in substantially the set position and set attitude, it is necessary to perform orbit control and attitude control on the satellite.

Orbit control consists of limiting variations in the orbital parameters generally expressed in terms of inclination, longitude, and eccentricity of the satellite's orbit. In the case of a satellite in GEO orbit, such as a telecommunications satellite, orbit control amounts to controlling the position of the satellite relative to the Earth, and is also known as station keeping (or "S/K") in the literature.

Orbit control of a satellite in GEO orbit is usually achieved by means of several thrust maneuvers during which the satellite's thrusters are activated. Satellite orbit control is performed by adjusting the thrust forces created by these thrusters during the various thrust maneuvers, but also by adjusting the activation durations of said thrusters.

Generally, the most important requirements for orbit control concern controlling the inclination of the satellite's orbit, which is achieved by performing thrust maneuvers called North/South (N/S) maneuvers on both sides of the Earth, respectively in the vicinity of the ascending node and of the descending node of the satellite's orbit. In the vicinity of the ascending node, the thrust maneuver creates a thrust force which tends to bring the satellite back towards the southern hemisphere. In the vicinity of the descending node, the thrust maneuver creates a thrust force which tends to bring the satellite back towards the northern hemisphere.

Attitude control consists of controlling the satellite's orientation, in particular relative to the Earth. When the satellite is stationed in orbit, perturbations apply torques which tend to cause said satellite to rotate around its center of mass and therefore to modify the attitude of said satellite relative to the set attitude (mission attitude). Note that orbit control thrust maneuvers can also apply perturbation torques when the thrust forces are not perfectly aligned with the satellite's center of mass.

In order to maintain the satellite in the set attitude, the satellite is generally equipped with an angular momentum storage device. The angular momentum storage device comprises, for example, at least three reaction wheels with linearly independent axes of rotation. By controlling the speed of rotation of said reaction wheels, it is possible to create torques to oppose the perturbation torques.

Due to the cumulative effect of the perturbation torques, the speeds of rotation of said reaction wheels and therefore the stored angular momentum tend to increase progressively. It is therefore necessary to regularly desaturate the angular momentum storage device in order to limit the velocity deviation of said reaction wheels. "Desaturate" is understood to mean applying external torques to the satellite which, when they are taken up by the angular momentum storage device, allow reducing the amount of angular momentum stored. Such desaturation of the angular momentum storage device is known as "angular momentum unloading" in the literature.

Desaturation of the angular momentum storage device generally makes use of the satellite's thrusters, which are activated during attitude control thrust maneuvers.

A solution is known from document EP 3157815 A1 which allows reducing both the number of thrusters on board the satellite and the number of thrust maneuvers, making it possible to perform orbit control (inclination, longitude, eccentricity) as well as three-axis desaturation of the satellite's angular momentum storage device.

In document EP 3157815 A1, the satellite is equipped with two articulated arms each having at least three degrees of freedom, supporting respective thrusters and being arranged one on either side of a body of the satellite, one articulated arm being arranged on the North side of the satellite while the other articulated arm is arranged on the South side of the satellite. In document EP 3157815 A1, a maneuver plan is used, comprising at least two thrust maneuvers respectively executed in the vicinity of the ascending node and of the descending node of the satellite's orbit. The thrust forces of these two thrust maneuvers are determined so as to control the inclination, longitude, and eccentricity of the satellite's orbit, and to create torques to desaturate the storage device. In addition, the thrust forces are deliberately non-parallel within the inertial frame of reference, in order to allow three-axis desaturation of the storage device to be carried out in these two thrust maneuvers.

The solution proposed by document EP 3157815 A1 thus makes it possible, by means of two articulated arms supporting thrusters, to control all the orbital parameters and to perform three-axis desaturation of the storage device, while reducing the number of thrust maneuvers.

However, in some cases, there may be a greater need in terms of three-axis desaturation of the storage device, which, in the case of the solution proposed by document EP 3157815 A1, requires a more clear differentiation between the thrust forces and the thrust maneuvers in the inertial frame of reference. This can be achieved by moving at least one of the thrust forces further away from the ascending or descending node of the orbit. However, the thrust maneuver is then less effective, particularly in controlling the inclination of the satellite's orbit, which leads to excess consumption of fuels to control the satellite's orbit. Another solution is to place more stress on the joints of the articulated arms, to further differentiate the thrust forces from the thrust maneuvers. However, such greater stress on the joints of the articulated arms could increase the probability of failure of one of the articulated arms, especially during the second half of the duration of the satellite mission.

DISCLOSURE OF THE INVENTION

The objective of the present invention is to remedy some or all of the limitations of the prior art solutions, in particular those set forth above, by proposing a solution which allows increasing the controllability of the satellite, in particular increasing the desaturation capacity, while reducing the excess consumption of fuel and the stresses on the articulated arms.

To this end, and according to a first aspect, a method is proposed for orbit control of a satellite in orbit around the Earth and for desaturation of an angular momentum storage device of said satellite, said satellite comprising two articulated arms each having at least three degrees of freedom and each supporting a propulsion unit, the satellite's orbit comprising two opposite orbital nodes, said method comprising:
- determining a maneuver plan for controlling the satellite's orbit and for desaturating the storage device, said maneuver plan comprising at least two thrust maneuvers, a first thrust maneuver to be executed using the propulsion of one of the articulated arms when the satellite is located near one of the orbital nodes, a second thrust maneuver to be executed using the propulsion unit of the other articulated arm when the satellite is located near the other orbital node,
- controlling the articulated arms and propulsion units according to the maneuver plan.

In addition, at least one of said first and second thrust maneuvers is what is referred to as a discontinuous thrust maneuver, said discontinuous thrust maneuver being composed of at least two separate consecutive thrust sub-maneuvers.

As in the prior art, the satellite's orbit and the desaturation of the angular momentum storage device are therefore controlled by means of a maneuver plan defined over one or more orbital periods. The maneuver plan comprises a first thrust maneuver which is executed by means of one of the articulated arms and the propulsion unit that it supports, near one of the orbital nodes (the ascending node or the descending node), and a second thrust maneuver which is executed by means of the other articulated arm and the propulsion unit that it supports, near the other orbital node (the descending node if the first thrust maneuver is executed near the ascending node, or vice versa).

In order to increase controllability of the satellite, and in particular to increase the desaturation capacity during the maneuver plan, at least one of said first and second thrust maneuvers is what is referred to as a discontinuous thrust maneuver. The discontinuous thrust maneuver is composed of at least two separate consecutive thrust sub-maneuvers, meaning that they are separated by a thrust interruption time interval of non-zero duration, during which the propulsion unit is no longer creating a thrust force. All thrust sub-maneuvers of a single discontinuous thrust maneuver are executed using the same articulated arm and the same propulsion unit.

By breaking down a thrust maneuver into separate consecutive thrust sub-maneuvers, the capacity for three-axis desaturation is improved. Indeed, the longer the duration of the thrust interruption time interval, the more the satellite will move along its orbit. Thus, even without modifying the position and orientation of the propulsion unit in the satellite's frame of reference during the thrust interruption time interval, the thrust force applied at the end of a thrust sub-maneuver will be different, in the inertial frame of reference, from the force applied at the start of the next thrust sub-maneuver, allowing three-axis desaturation during a same discontinuous thrust maneuver. Such an improvement in the capacity for three-axis desaturation can be achieved without necessarily needing:
- to place more stress on the articulated arm, since the thrust force is changed in the inertial frame of reference simply because of the movement of the satellite during the thrust interruption time interval,
- to greatly increase fuel consumption: indeed, the duration of a thrust maneuver can be lengthened over time by introducing a thrust interruption time interval, without having to increase the actual activation duration of the propulsion unit (equal to the total duration of the thrust sub-maneuvers); if the thrust sub-maneuvers are executed close to the orbital node, the loss of orbit control efficiency (and the associated excess consumption) is reduced.

Thus, for a constant activation time of the propulsion unit supported by the articulated arm, breaking down a thrust maneuver into separate consecutive thrust sub-maneuvers makes it possible to spread said thrust maneuver over time, which makes it possible to introduce diversity in the thrust direction and therefore the capacity for three-axis desaturation, at the level of the discontinuous thrust maneuver. Such a capacity for three-axis desaturation at the level of the discontinuous thrust maneuver may be considered alone or may be combined with a capacity for three-axis desaturation at the level of the maneuver plan, for example by considering thrust forces in respective non-parallel thrust directions within the inertial frame of reference for the first thrust maneuver and second thrust maneuver.

In some particular embodiments, the control method may further include one or more of the following features, in isolation or in any technically possible combinations.

In some particular embodiments, the discontinuous thrust maneuver comprises at least a thrust sub-maneuver referred to as upstream thrust sub-maneuver, to be executed upstream of said orbital node, and a thrust sub-maneuver referred to as downstream thrust sub-maneuver, to be executed downstream of said orbital node. Such arrangements make it possible to improve the efficiency of the orbit control, since at least two thrust sub-maneuvers can be executed close to the orbital node of the discontinuous thrust maneuver.

In some particular embodiments, the at least two thrust sub-maneuvers of the discontinuous thrust maneuver are executed when the satellite is located within an angular range of at most 60° centered on the orbital node of the discontinuous thrust maneuver. Such arrangements make it possible to improve the efficiency of the orbit control, since no thrust sub-maneuver is executed in a position where the satellite is too far from the orbital node.

In some particular embodiments, the other of said first and second thrust maneuvers of the maneuver plan is a continuous thrust maneuver, and the cumulative duration of the thrust sub-maneuvers of the discontinuous thrust maneuver is less than 1.5 times the duration of said continuous thrust maneuver. Indeed, as indicated above, the actual activation duration of the propulsion unit during the discontinuous thrust maneuver does not necessarily have to be increased. Thus, the cumulative duration of the thrust sub-maneuvers of a discontinuous thrust maneuver may be of the same order of magnitude as the duration of a continuous thrust maneuver, possibly slightly longer to compensate for a loss of efficiency in the orbit control.

In some particular embodiments, in a satellite's frame of reference, the thrust direction of the thrust force applied by the propulsion unit at the end of a thrust sub-maneuver is substantially identical to the thrust direction of the thrust force applied by said propulsion unit at the start of the next thrust sub-maneuver. Indeed, the movement of the satellite during the thrust interruption time interval inherently introduces diversity in the thrust direction, such that it is not necessary to apply forces to the articulated arm to modify the position and orientation of the propulsion unit.

In some particular embodiments, the articulated arm used to execute the discontinuous thrust maneuver comprises at least three joints each having at least one degree of freedom in rotation about an axis of rotation, the respective angular positions of said at least three joints not being modified between two consecutive thrust sub-maneuvers of a same discontinuous thrust maneuver, or, if an angular position is modified, it is modified by at most 2°.

In some particular embodiments, the control method comprises a thrust control mode referred to as continuous thrust control mode which uses a maneuver plan comprising no discontinuous thrust maneuver, and a thrust control mode referred to as discontinuous thrust control mode which uses a maneuver plan comprising at least one discontinuous thrust maneuver, the discontinuous thrust control mode being used when a predetermined discontinuous thrust control criterion is satisfied.

In some particular embodiments, the discontinuous thrust control criterion is dependent on a requirement in terms of desaturation of the storage device.

Indeed, given that a discontinuous thrust maneuver makes it possible to increase the capacity for three-axis desaturation, it is advantageous to use discontinuous thrust control mode when the requirement in terms of desaturation, in particular three-axis desaturation, is significant.

In some particular embodiments, the discontinuous thrust control criterion is satisfied when the requirement in terms of desaturation, in particular three-axis desaturation, is such that a maneuver plan comprising no discontinuous thrust would lead to excess fuel consumption exceeding a predetermined threshold value, in comparison to a maneuver plan comprising discontinuous thrust.

In some particular embodiments, the maneuver plan comprises at least one thrust maneuver per orbital period.

In some particular embodiments, the first thrust maneuver and the second thrust maneuver have initial thrust forces of the propulsion units that are in respective non-parallel thrust directions in the inertial frame of reference, said thrust forces being determined so as to create torques in respective non-parallel planes in the inertial frame of reference and to carry out three-axis desaturation of said angular momentum storage device. Preferably, the initial thrust forces of the thrust sub-maneuvers are thrust directions that are not parallel to each other in the inertial frame of reference, and not parallel to a thrust direction of a thrust force of the other thrust maneuver.

In some particular embodiments, the first thrust maneuver and the second thrust maneuver have thrust forces of the propulsion units that are determined so as to control at least the inclination of the satellite's orbit.

In some particular embodiments, the first thrust maneuver and the second thrust maneuver have thrust forces of the propulsion units that are determined so as to further control at least one among the eccentricity and the longitude of the satellite's orbit.

According to a second aspect, a satellite is proposed that is intended to be placed in orbit around the Earth, comprising two articulated arms each having at least three degrees of freedom and each supporting a propulsion unit. In addition, the satellite comprises means configured to implement a method for orbit control and desaturation according to any one of the embodiments of the invention.

According to a third aspect, a satellite system is proposed comprising a ground station and a satellite in orbit around the Earth, said satellite comprising two articulated arms each having at least three degrees of freedom and each supporting a propulsion unit. In addition, the satellite system comprises means configured to implement a method for orbit control and desaturation according to any one of the embodiments of the invention.

In some particular embodiments, the satellite system may further comprise one or more of the following features, separately or in any of the technically possible combinations.

In some particular embodiments, each articulated arm comprises at least three joints each having at least one degree of freedom in rotation about an axis of rotation, a first joint and a second joint being separated by a first connecting member and having non-parallel respective axes of rotation, the second joint and a third joint being separated by a second connecting member and having non-parallel respective axes of rotation.

In some particular embodiments, the propulsion units comprise only electric thrusters.

In some particular embodiments, the satellite comprises only electric thrusters.

In some particular embodiments, the satellite is in geostationary orbit.

PRESENTATION OF FIGURES

Figure 2:
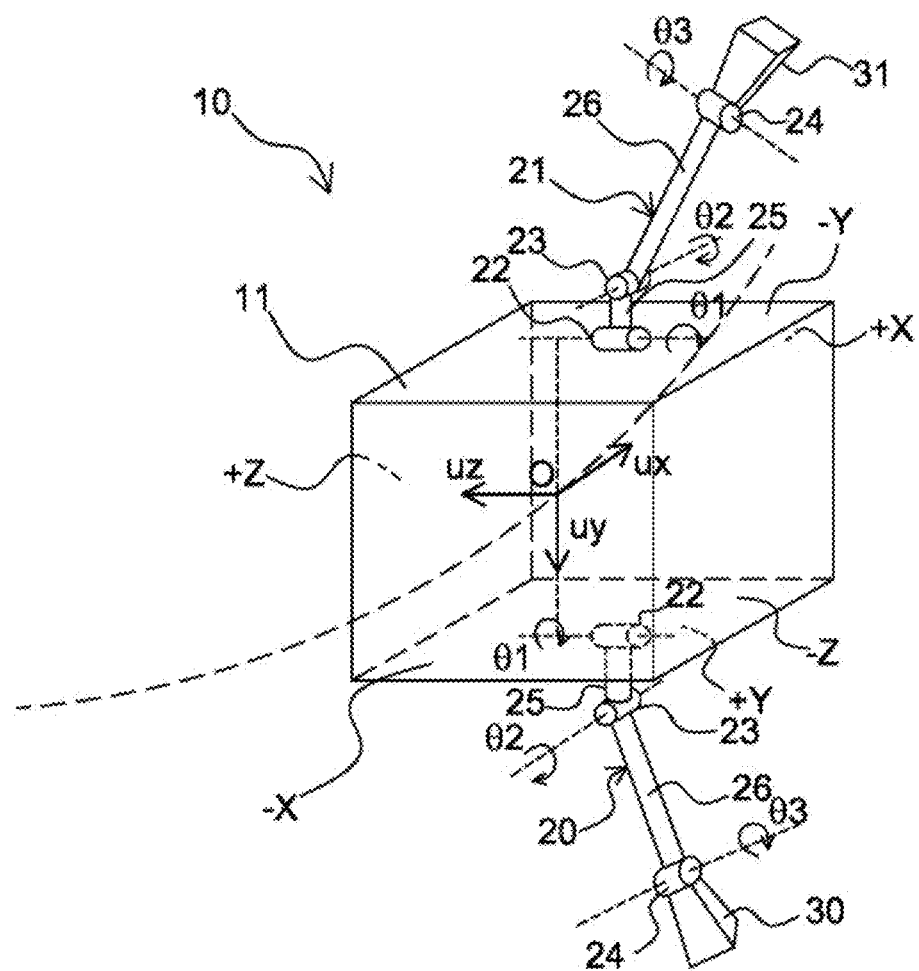
Figure 3:
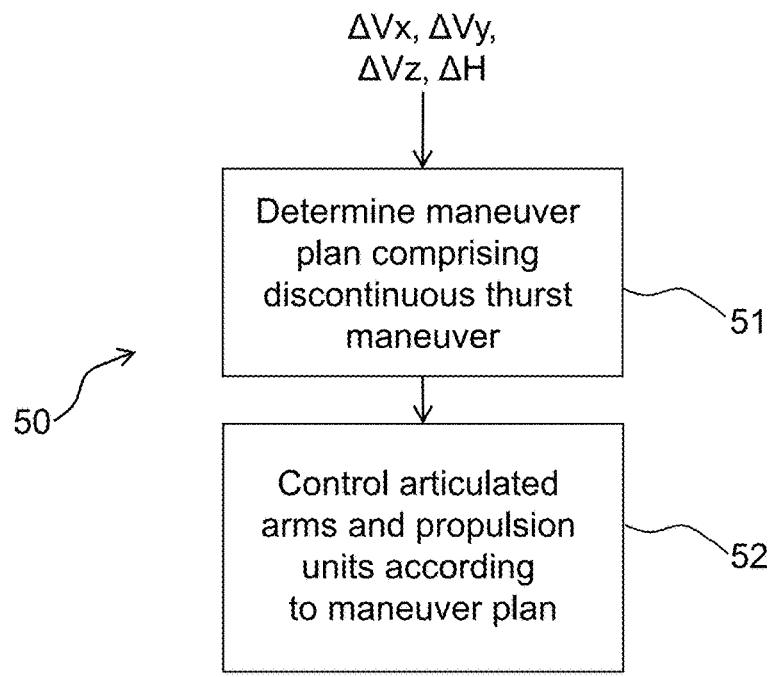
Figure 4:
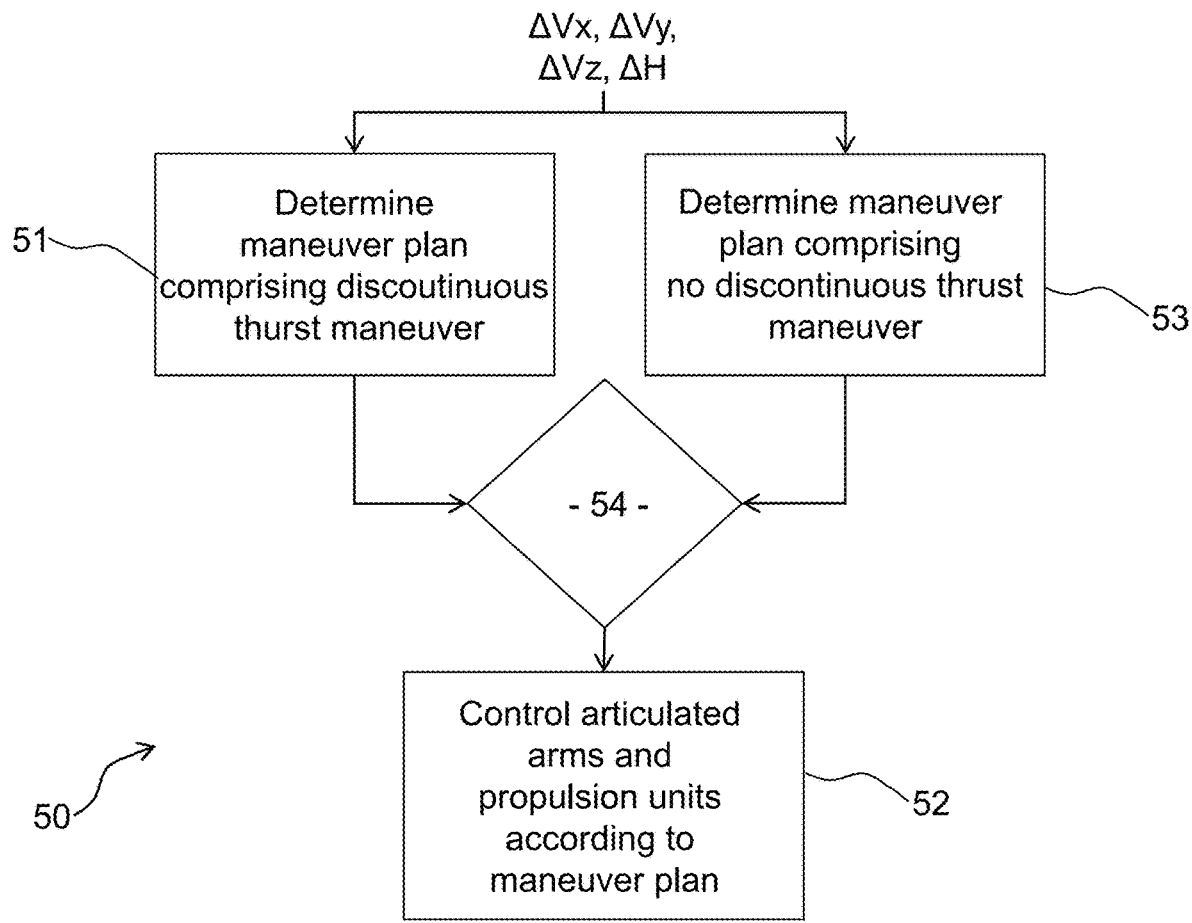
Figure 5:
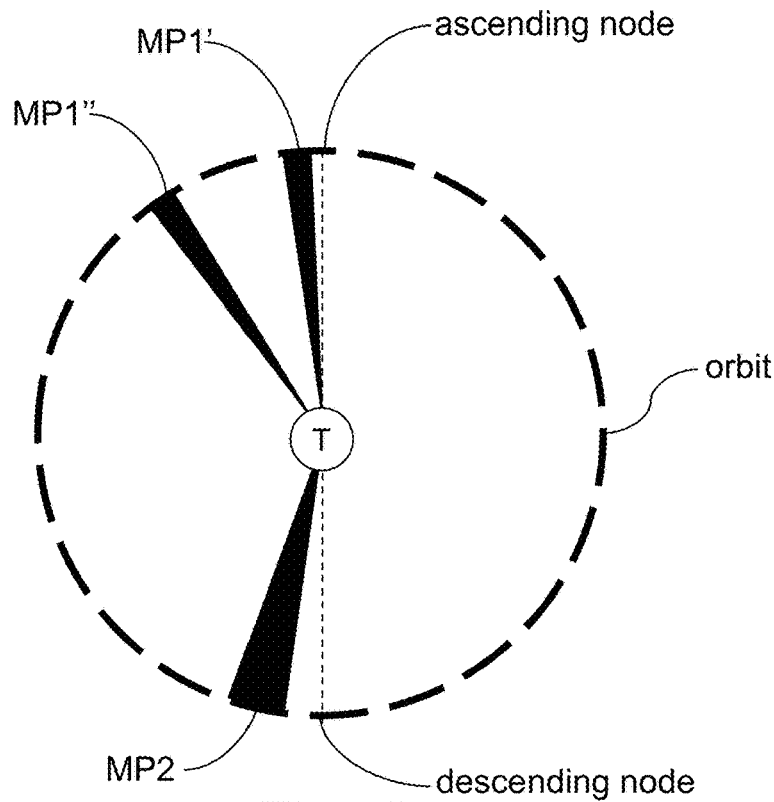
Figure 6:
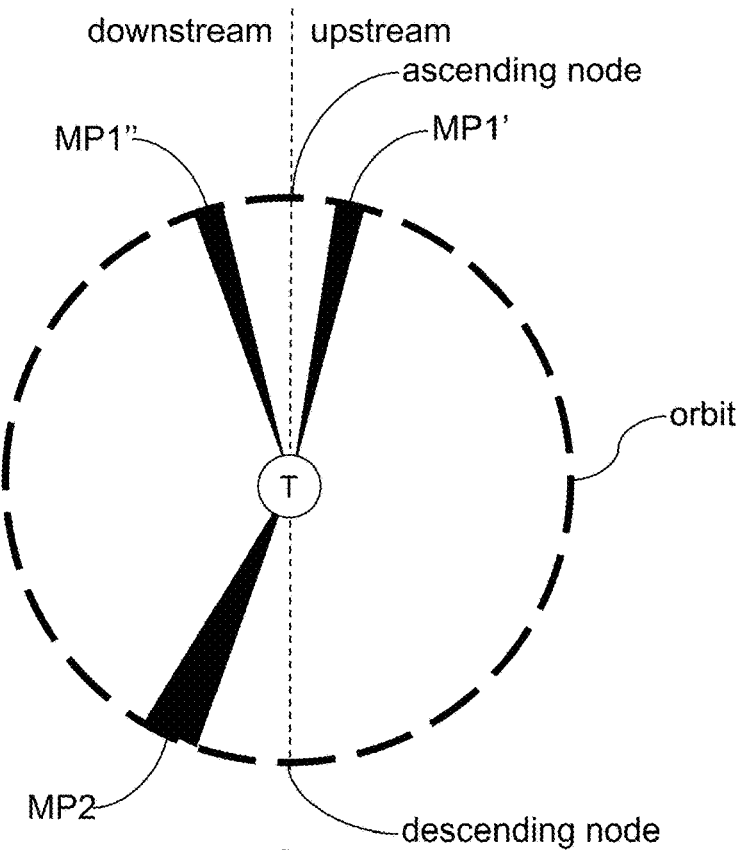
Figure 7:
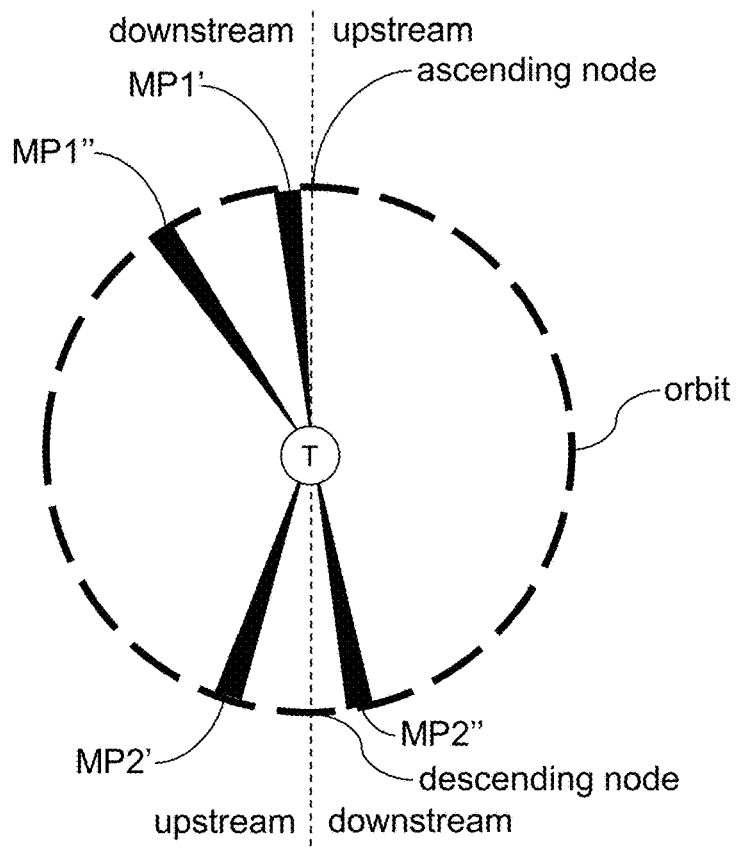
Figure 8:
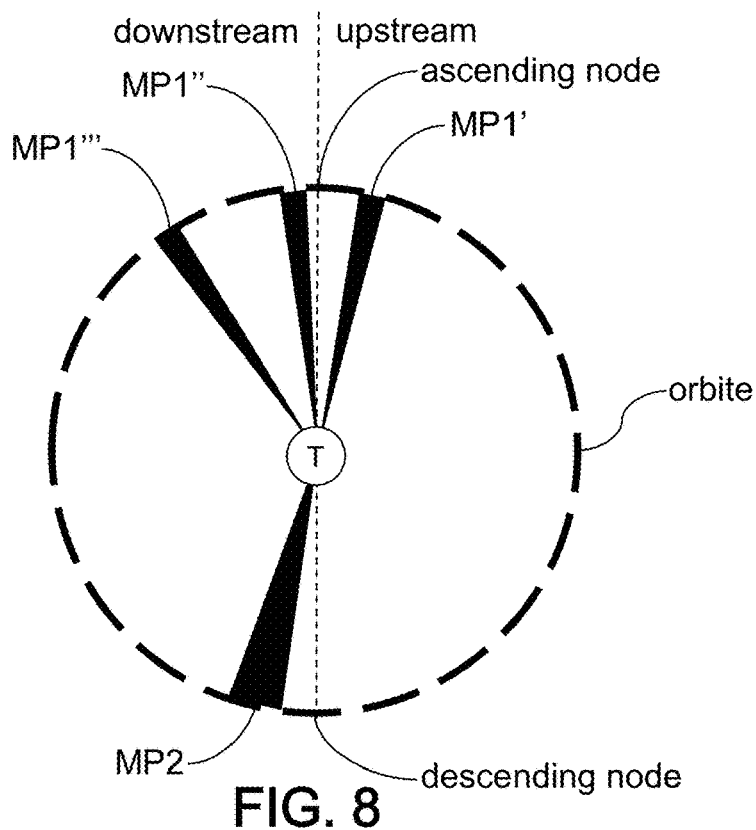
Figure 9:
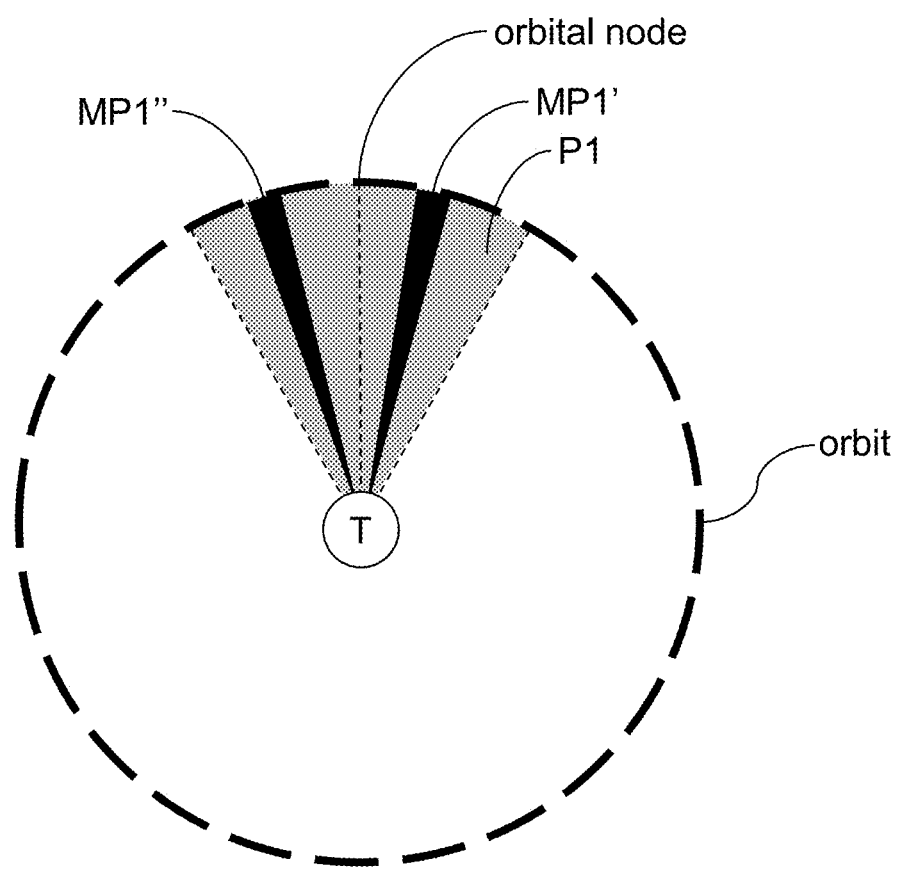

The invention will be better understood upon reading the following description, given as a non-limiting example, and made with reference to the figures which represent:

FIG. 1: a schematic representation of a satellite in orbit around the Earth,

FIG. 2: a schematic representation of an exemplary embodiment of a satellite,

FIG. 3: a diagram illustrating the main steps of one embodiment of a method for orbit control and desaturation, FIG. 4: a diagram illustrating the main steps of a variant embodiment of the method for orbit control and desaturation, FIG. 5: a schematic representation of a first example of a maneuver plan, FIG. 6: a schematic representation of a second example of a maneuver plan, FIG. 7: a schematic representation of a third example of a maneuver plan, FIG. 8: a schematic representation of a fourth example of a maneuver plan, FIG. 9: a schematic representation of a preferred embodiment for implementing a maneuver plan.

In these figures, identical references in different figures designate identical or similar elements. For clarity, the items represented are not to scale unless otherwise noted.

DESCRIPTION OF EMBODIMENTS

FIG. 1 schematically represents a satellite 10 in orbit around the Earth T.

In the remainder of the description, reference is made in a non-limiting manner to the case of a satellite 10 in GEO orbit. However, nothing excludes considering other types of Earth orbits in other examples, for example geosynchronous orbits, medium earth orbits (MEO), low earth orbits (LEO), etc.

For the purposes of the description, the satellite 10 is associated with a satellite's frame of reference centered on a center of mass O of the satellite 10 and having three axes X, Y, Z. More particularly, axis X is parallel to a velocity vector of the satellite 10 within the inertial frame of reference, axis Z is directed towards the center of the Earth T, and axis Y is orthogonal to axes X and Z. Each of the axes X, Y, and Z of the satellite's frame of reference is associated with unit vectors, respectively ux, uy, and uz. Unit vector ux corresponds to the velocity vector normalized by the norm of said velocity vector, unit vector uz is oriented from the center of mass O of the satellite 10 towards the center of the Earth T, and unit vector uy is oriented such that the set (ux, uy, uz) constitutes a direct orthonormal basis of the satellite's frame of reference.

As illustrated by FIG. 1, the satellite 10 comprises for example a body 11 and two solar generators 12 one on either side of the body 11. The two solar generators 12 are for example mounted to be rotatable relative to the body 11 of the satellite 10, about a same axis of rotation.

In the remainder of the description, in a non-limiting manner, the case is considered where the body 11 of the satellite 10 is substantially in the shape of a rectangular parallelepiped. The body 11 thus comprises six faces, the pairs of opposite faces being parallel, and the two solar generators 12 are arranged respectively on two opposite faces of said body 11, the axis of rotation of said two solar generators 12 being substantially orthogonal to said two opposite faces of the body 11 of the satellite 10.

The remainder of the description concerns the case where the attitude of the satellite 10 is controlled, for the purposes of the mission of said satellite 10, so as to be placed in a set attitude called the "mission attitude". For example, the mission attitude is such that:
- a face of the body 11 of the satellite 10, designated as "face +Z", carrying for example a payload instrument of said satellite 10, is directed towards the Earth and is substantially orthogonal to axis Z; the face opposite to face +Z, then being on the side facing away from the Earth, is designated as "face −Z";
- the two opposite faces of the body 11 of the satellite 10 on which the two solar generators 12 are arranged, respectively designated "face +Y" (relative to the center of mass O: on the side pointed to by unit vector uy) and "face −Y", are substantially orthogonal to axis Y;
- the last two opposite faces of the body 11 of the satellite 10, respectively designated "face +X" (relative to the center of mass O: on the side pointed to by unit vector ux) and "face −X", are substantially orthogonal to axis X.

In addition, the satellite 10 in the considered example being in GEO orbit, the orbital plane of the satellite 10, which corresponds to the equatorial plane, is coincident with plane (X, Z) when said satellite 10 is in its mission attitude. The −Y face is on the northern hemisphere side and is also referred to as the "North face", and the +Y face is on the southern hemisphere side and is also referred to as the "South face".

The satellite 10 also comprises a set of actuators suitable for controlling the orbit and attitude of said satellite 10, as well as a control device (not shown in the figures) for said actuators, which is also on board said satellite 10.

For the purposes of attitude control, the satellite 10 comprises in particular an angular momentum storage device (not shown in the figures) suitable for storing an angular momentum of any axis, i.e. having a capacity for storing angular momentum along three linearly-independent axes. The angular momentum storage device comprises a set of inertial actuators such as reaction wheels and/or control moment gyroscopes. For example, the angular momentum storage device comprises at least three reaction wheels having respective linearly independent axes of rotation.

As indicated above, orbit control consists of controlling at least one orbital parameter among the inclination, longitude, and eccentricity of the orbit of the satellite 10. In the case of a satellite 10 in GEO orbit, it is known that the requirements in terms of orbit control, for example expressed in terms of the speed variation required per year (m/s/year), are mainly imposed by controlling the inclination of the orbit of the satellite 10 (North/South or N/S control). The order of magnitude of the speed variation required per year for N/S control, along axis Y, is thus 50 m/s/year, while it is 2-4 m/s/year for longitudinal orbit control (East/West or E/W control), along axis X.

In the invention, the satellite 10 comprises, for the purposes of orbit control and desaturation of the angular momentum storage device, at least two articulated arms each having at least three degrees of freedom, and each supporting a propulsion unit. The two articulated arms are adapted to move the propulsion units within different respective movement volumes in the satellite's frame of reference. Due to the at least three degrees of freedom, each articulated arm makes it possible to modify, in the satellite's frame of reference, both the thrust direction and the point of application of a thrust force created by the propulsion unit supported by this articulated arm.

Each propulsion unit comprises at least one thruster. In preferred embodiments, each propulsion unit comprises at least two thrusters, for example in order to compensate for a failure of one of the thrusters and/or in order to distribute their use so that they alternate for the duration of the mission of the satellite 10.

FIG. 2 schematically represents one particular embodiment of a satellite 10 comprising two articulated arms 20, 21, Each articulated arm 20, 21 comprises a first end connected to the body 11 of the satellite 10, and a second end supporting a propulsion unit 30, 31.

Preferably, the propulsion units 30, 31 comprise only electric thrusters (electrothermal, electrostatic, plasma, etc.). However, in other examples, nothing excludes one or both propulsion units 30, 31 comprising chemical propellants (cold gas, liquid fuels, etc.).

In general, each of the two articulated arms 20, 21 has at least three degrees of freedom, and said two articulated arms 20, 21 are suitable for moving the propulsion units 30, 31 within different respective movement volumes. For example, and as illustrated by FIG. 2, the respective movement volumes of the articulated arms 20, 21 are contained within respective half-spaces that are opposite each other relative to the orbital plane of the satellite 10. As indicated above, the orbital plane, which corresponds to the equatorial plane, corresponds to plane (X, Z) when the satellite 10 is at its mission attitude. The respective movement volumes of the articulated arms 20 and 21 are contained, in the example illustrated by FIG. 2:
- within the half-space delimited by plane (X, Z) at the South face (+Y) side for articulated arm 20,
- in the half-space delimited by plane (X, Z) at the North face (−Y) side for articulated arm 21.

In general, throughout this application, a thrust force is defined by a thrust vector and a point of application of said thrust force relative to the center of mass O of the satellite 10. The thrust vector is itself defined by a thrust norm and by a unit norm thrust direction, which corresponds to the thrust vector normalized by said thrust norm. It is therefore understood that the articulated arms 20, 21 allow modifying, within the satellite's frame of reference, both the thrust directions and the points of application of the thrust forces created by the propulsion units 30, 31.

In the example illustrated by FIG. 2, the first end of articulated arm 20 is located on the South face, while the first end of articulated arm 21 is located on the North face, of the body 11 of the satellite 10. In this example, the first ends of the articulated arms 20, 21 are connected to the body 11 of the satellite 10 at respective points which are offset towards the −Z face relative to the orthogonal projections of the theoretical center of mass onto the South and North faces. Such a configuration of the articulated arms 20, 21, connected to the body 11 of the satellite 10 at points offset towards the −Z face relative to the orthogonal projections of the theoretical center of mass, makes it easier to control the eccentricity of the orbit of the satellite 10. Indeed, the thrust force of propulsion unit 30 (respectively propulsion unit 31), when it is applied at a point of application such that no torque is created, then comprises a non-zero component along axis Z.

However, other positions are possible for the first ends of the articulated arms 20, 21. According to another non-limiting example, the first ends of the articulated arms 20, 21 may both be positioned on the −Z face of the satellite, near the South face for articulated arm 20 and near the North face for articulated arm 21.

In the example illustrated by FIG. 2, each articulated arm 20, 21 comprises three joints 22, 23, 24, each joint having at least one degree of freedom in rotation about an axis of rotation. Joints 22 and 23 are connected to each other and separated by connecting member 25, while joints 23 and 24 are connected to each other and separated by connecting member 26. In addition, for each articulated arm 20, 21, the respective axes of rotation of adjacent joints 22, 23, 24 are not parallel for each of the two pairs of adjacent joints. Thus, the axes of rotation of joints 22 and 23 are not parallel to each other, and the axes of rotation of joints 23 and 24 are not parallel to each other.

To control the thrust direction and the point of application of the thrust force, the control device controls the angular positions of the joints 22, 23, 24, designated respectively by θ1, θ2, and θ3.

Such articulated arms 20, 21 having three degrees of freedom make it possible to control all orbital parameters of the orbit of the satellite 10 and to desaturate the angular momentum storage device along three axes, without it being necessary to equip the satellite 10 with thrusters other than those of propulsion units 30, 31 in order to perform orbit control and desaturation. Such articulated arms 20, 21 may also be used for positioning the satellite 10 in its mission orbit, by orienting the propulsion units 30, 31 so as to create thrust forces having significant components along axis Z.

Orbit control of the satellite 10 and desaturation of the angular momentum storage device are carried out, at the control device, by controlling the articulated arms 20, 21, and the propulsion units 30, 31 supported by the articulated arms, according to a maneuver plan comprising at least two thrust maneuvers. During each thrust maneuver, the propulsion unit 30, 31 of an articulated arm 20, 21 is activated to create a thrust force.

The control device comprises for example at least one processor and at least one electronic memory in which a computer program product is stored in the form of a set of program code instructions to be executed in order to control the articulated arms 20, 21 and the propulsion units 30, 31 according to the maneuver plan. In a variant, the control device comprises one or more programmable logic circuits of a type such as FPGA, PLD, etc., and/or application-specific integrated circuits (ASIC) suitable for implementing all or part of said steps for controlling the articulated arms 20, 21 and propulsion units 30, 31 according to the maneuver plan. In other words, the control device comprises a set of means configured in software (specific computer program product) and/or hardware (FPGA, PLD, ASIC, etc.) to control the articulated arms 20, 21 and the propulsion units 30, 31 they are supporting, according to the maneuver plan.

In general, the maneuver plan, which may be defined over one or more orbital periods, comprises at least two thrust maneuvers, namely a first thrust maneuver and a second thrust maneuver.

The first thrust maneuver and the second thrust maneuver are executed when the satellite 10 is located in the vicinity of different respective orbital nodes. As is known, orbital nodes consist of an ascending node and a descending node. In practice, the ascending node corresponds to the point in the orbit where the satellite 10 transitions from the southern hemisphere to the northern hemisphere, and the descending node corresponds to the point in the orbit where the satellite 10 transitions from the northern hemisphere to the southern hemisphere.

For example, the first thrust maneuver is executed when the satellite 10 is at the ascending node side of the orbit, i.e. within an angular range of at most 180° centered on the ascending node, and the second thrust maneuver is executed when the satellite 10 is at the descending node side of the orbit, i.e. within an angular range of at most 180° centered on the descending node.

In the case of the articulated arms 20, 21 configuration shown in FIG. 2, the first thrust maneuver uses only articulated arm 21 (and propulsion unit 31) among the articulated arms 20, 21, while the second thrust maneuver uses only articulated arm 20 (and propulsion unit 30) among the articulated arms 20, 21. Indeed, articulated arm 20 can create thrust forces which push the satellite 10 towards the North, which are useful at the descending node. Conversely, articulated arm 21 can create thrust forces which push the satellite 10 towards the South, which are useful at the ascending node.

In addition, the maneuver plan is such that at least one of said first and second thrust maneuvers is what is referred to as a discontinuous thrust maneuver. The discontinuous thrust maneuver is composed of at least two separate consecutive thrust sub-maneuvers, meaning they are separated by a thrust interruption time interval of non-zero duration, during which the propulsion unit no longer creates a thrust force. Although discontinuous, it is still the same thrust maneuver as long as:
  it is the same articulated arm 20, 21 and the same propulsion unit 30, 31 which are used during all the thrust sub-maneuvers of the discontinuous thrust maneuver, and
  the thrust sub-maneuvers of the discontinuous thrust maneuver are all executed in the vicinity of the orbital node of the discontinuous thrust maneuver, before the satellite 10 arrives within the angular range of at most 180° centered on the other orbital node; in other words, all thrust sub-maneuvers of a same discontinuous thrust maneuver are executed during the same half-orbital period.

Given that a discontinuous thrust maneuver aims to divide a continuous thrust maneuver into separate consecutive thrust sub-maneuvers, the movements of the articulated arm 20, 21 that is used during the discontinuous thrust maneuver are preferably small or even zero within the satellite's frame of reference during the thrust interruption time interval. Thus, in the satellite's frame of reference, the thrust direction of the thrust force applied by the propulsion unit 30, 31 at the end of a thrust sub-maneuver is preferably substantially identical to the thrust direction of the thrust force applied by said propulsion unit 30, 31 at the start of the thrust sub-maneuver which immediately follows. Substantially identical is understood to mean that the following expression is satisfied:

$$\frac{F_1'(T_{1,f}') \cdot F_1''(T_{1,d}'')}{\|F_1'(T_{1,f}')\|\|F_1''(T_{1,d}'')\|} > 0.9 \qquad \text{[Math. 1]}$$

an expression in which:

- $F_1'(T_{1,f}')$ corresponds to the thrust vector $F_1'$ of the thrust force at the end of a first thrust sub-maneuver which ends on date $T_{1,f}'$, expressed in the satellite's frame of reference,
- $\|F_1'(T_{1,f}')\|$ corresponds to the thrust norm of thrust vector $F_1'(T_{1,f}')$, such that $F_1'(T_{1,f}')/\|F_1'(T_{1,f}')\|$ corresponds to the thrust direction of thrust vector $F_1'(T_{1,f}')$,
- $F_1''(T_{1,d}'')$ corresponds to the thrust vector $F_1''$ of the thrust force at the start of a second thrust sub-maneuver which begins at date $T_{1,d}''$, expressed in the satellite's frame of reference,
- $\|F_1''(T_{1,d}'')\|$ corresponds to the thrust norm of $F_1''(T_{1,d}'')$, such that $F_1''(T_{1,d}'')/\|F_1''(T_{1,d}'')\|$ corresponds to the thrust direction of thrust vector $F_1''(T_{1,d}'')$,
- a·b corresponds to the scalar product of vectors a and b.

In other words, the scalar product of the thrust direction of the thrust force applied by the propulsion unit 30, 31 at the end of a thrust sub-maneuver, and the thrust direction of the thrust force thrust applied by said propulsion unit 30, 31 at the start of the thrust sub-maneuver which immediately follows, is greater than 0.9. Preferably, said scalar product is greater than 0.95.

For example, it is possible not to modify the angular positions θ1, θ2, and θ3 of the joints 22, 23, 24 of the articulated arm 20, 21 used during the discontinuous thrust maneuver, between two consecutive thrust sub-maneuvers of a same discontinuous thrust maneuver. Failing this, only small modifications can be authorized, for example modifications of less than 1° or 2° of each of the angular positions θ1, θ2, and θ3, so as not to overly stress the articulated arm 20, 21.

The purpose of the thrust interruption time interval is in particular to spread the discontinuous thrust maneuver over time (and along the orbit) without needing to increase the activation duration of the propulsion unit 30, 31 used during the discontinuous thrust maneuver. Consequently, in preferred embodiments, the cumulative duration of the thrust sub-maneuvers of the discontinuous maneuver is preferably of the same order of magnitude as the duration of a continuous thrust maneuver. For example, if the maneuver plan also includes a continuous thrust maneuver, the cumulative duration of the thrusting sub-maneuvers of the discontinuous thrust maneuver (i.e. the duration of the discontinuous thrust maneuver minus the duration of the thrust interruption time interval) is preferably less than 1.5 times the duration of said continuous thrust maneuver, or even less than 1.2 times this duration. Preferably, the maximum possible duration of each thrust sub-maneuver of a discontinuous thrust maneuver is strictly less than the minimum possible duration of a continuous thrust maneuver.

In general, the main parameters to be adjusted in the maneuver plan are, for example:

- the start dates of the various thrust maneuvers, i.e. the dates of activation of the propulsion unit 30, 31,
- the activation durations of the various thrust maneuvers, i.e. the activation durations of the propulsion unit 30, 31,
- for each discontinuous thrust maneuver, the duration and the start date of each thrust interruption time interval of the propulsion unit 30, 31,
- the thrust directions and the points of application, relative to the center of mass O of the satellite 10, of the respective thrust forces of the various thrust maneuvers.

The remainder of the description concerns, in a non-limiting manner, the case where the thrust direction and the point of application of each thrust force of the maneuver plan are fixed in the satellite's frame of reference for the entire duration of the corresponding thrust maneuver. In other words, the values of the angular positions θ1, θ2, and θ3 of the joints 22, 23, 24 of the articulated arm 21 are not modified during a same thrust maneuver (and are not modified between two thrust sub-maneuvers of a same discontinuous thrust maneuver). However, according to other examples, nothing excludes varying said values of the angular positions θ1, θ2, and θ3 in order to increase the number of degrees of freedom for the orbit control and desaturation.

It is also possible to adjust other parameters such as the thrust norms of the respective thrust forces of said various thrust maneuvers (in the case of a propulsion unit 30, 31 for which the thrust norm can be controlled).

In the remainder of the description, the maneuver plan is considered to include exactly two thrust maneuvers, i.e. exactly one first thrust maneuver and one second thrust maneuver. In addition, in a non-limiting manner, the first thrust maneuver is considered to be discontinuous, and considered to include exactly two thrust sub-maneuvers of the same duration. However, in other examples, nothing excludes considering thrust sub-maneuvers of different durations. The following references are used:

- $\Delta T_1$ for the activation duration of the propulsion unit 30, 31 during the first thrust maneuver (such that each thrust sub-maneuver has a duration $\Delta T_1/2$ in the example considered),
- $T_{1,d}'$ for the start date of the first thrust maneuver,
- $\Delta T_{IP}$ for the duration of the thrust interruption time interval, such that the second thrust sub-maneuver starts at date $T_{1,d}''=T_{1,d}'+\Delta T_1/2+\Delta T_{IP}$,
- $\theta 1(T_{1,d}')$, $\theta 2(T_{1,d}')$ and $\theta 3(T_{1,d}')$ for the angular positions of joints 22, 23, 24 at start date $T_{1,d}'$ (which are identical to those of start date $T_{1,d}''$ in the example considered),
- $T_2$ for the start date of the second thrust maneuver,
- $\Delta T_2$ for the activation duration of the propulsion unit 30, 31 during the second thrust maneuver,
- $\theta 1(T_2)$, $\theta 2(T_2)$ and $\theta 3(T_2)$ for the angular positions of joints 22, 23, 24 at start date $T_2$.

If we consider the case where the maneuver plan aims to control all the orbital parameters (inclination, longitude, eccentricity) of the orbit of the satellite 10 and to desaturate along three axes the angular momentum storage device of said satellite 10, then the system of equations to be solved comprises nine equations, relating to the following parameters:

$\Delta Vx(T_{1,d}')$ and $\Delta Vx(T_2)$, scalar parameters which correspond to the requirements in terms of the speed variation required along axis X (E/W control), during the first thrust maneuver and the second thrust maneuver, $\Delta Vy(T_{1,d}')$ and $\Delta Vy(T_2)$, scalar parameters which correspond to the requirements in terms of the speed variation required along axis Y (N/S control), during the first thrust maneuver and the second thrust maneuver, $\Delta Vz(T_{1,d}')$ and $\Delta Vz(T_2)$, scalar parameters which correspond to the requirements in terms of the speed variation required along axis Z (eccentricity control), during the first thrust maneuver and the second thrust maneuver, $\Delta H$, a vector of three scalar parameters corresponding to the components of the angular momentum to be removed from the angular momentum storage device at the end of the first thrust maneuver and the second thrust maneuver, expressed in an inertial frame of reference.

By adjusting the durations $\Delta T_1$ and $\Delta T_2$ and the start dates $T_{1,d}'$ and $T_2$ of said two thrust maneuvers, and the values of the angular positions $\theta 1(T_{1,d}')$, $\theta 2(T_{1,d}')$, $\theta 3(T_{1,d}')$, $\theta 1(T_2)$, $\theta 2(T_2)$, and $\theta 3(T_2)$ of joints 22, 23, 24 of articulated arms 20, 21 during said two thrust maneuvers, there is then a sufficient number of degrees of freedom to solve said system of equations. Since the first thrust maneuver is a discontinuous thrust maneuver, we also have an additional degree of freedom $\Delta T_{IP}$ for improving control and increasing the capacity for three-axis desaturation.

FIG. 3 schematically represents the main steps of a method 50 for orbit control of the satellite 10 and for desaturation of an angular momentum storage device of said satellite.

As illustrated by FIG. 3, the method 50 for orbit control and desaturation in particular comprises a step 51 of determining a maneuver plan as described above, comprising at least one discontinuous thrust maneuver defined over one or more orbital periods.

The thrust maneuvers of the maneuver plan are determined based on predetermined requirements for inclination control ($\Delta Vy$), longitude control ($\Delta Vx$), and eccentricity control ($\Delta Vz$) of the orbit of the satellite 10, and based on a predetermined requirement for desaturation ($\Delta H$) of the angular momentum storage device of said satellite 10.

In some particular embodiments, the respective initial thrust forces of the first thrust maneuver and second thrust maneuver (at start dates $T_{1,d}'$ and $T_2$) are preferably non-parallel thrust directions within the inertial frame of reference. Said initial thrust forces thus make it possible to create desaturation torques in respective planes not parallel to each other such that, over the set of said first and second thrust maneuvers, the vector space in which it is possible to create a desaturation torque is three-dimensional. Thus, in addition to the capacity for three-axis desaturation obtained within the discontinuous thrust maneuver, an additional capacity for three-axis desaturation is obtained over the set of said first and second thrust maneuvers. Preferably, the initial thrust forces of the thrust sub-maneuvers are all in thrust directions that are not parallel to each other in the inertial frame of reference, and not parallel to the thrust direction of the initial thrust force of the other thrust maneuver.

Once the maneuver plan has been determined, the method 50 for orbit control and desaturation includes a step 52 of controlling the articulated arms 20, 21, and the propulsion units 30, 31 supported by said articulated arms, according to the maneuver plan.

As indicated above, the control step 52 is implemented by the control device carried on board the satellite 10.

The step 51 of determining the maneuver plan may be executed at the satellite 10 by the control device on board said satellite 10, or on the ground by a ground station of a satellite system. In the case where the maneuver plan is determined by a ground station, said maneuver plan is transmitted to the satellite 10 for implementation by the control device. According to other examples, the maneuver plan may be determined jointly by the satellite 10 and the ground station.

The ground station comprises for example at least one processor and at least one electronic memory in which a computer program product is stored in the form of a set of program code instructions to be executed in order to determine the maneuver plan. In a variant, the ground station comprises one or more programmable logic circuits of types such as FPGA, PLD, etc., and/or application-specific integrated circuits (ASIC) suitable for determining the maneuver plan. In other words, the ground station comprises a set of means configured in software (specific computer program product) and/or hardware (FPGA, PLD, ASIC, etc.) to implement the various operations which allow determining the maneuver plan.

FIG. 4 schematically represents the main steps of a preferred embodiment of the method 50 for orbit control of the satellite 10 and for desaturation of an angular momentum storage device of said satellite. In the example illustrated by FIG. 4, the method 50 for control and desaturation comprises what is referred to as continuous thrust control mode which uses a maneuver plan comprising no discontinuous thrust maneuver, and what is referred to as discontinuous thrust control mode which uses a maneuver plan comprising at least one discontinuous thrust maneuver. In addition to the steps described with reference to FIG. 3, the method 50 for control and desaturation comprises a step 53 of determining a maneuver plan comprising no discontinuous thrust maneuver. In the example illustrated by FIG. 4, the step 53 of determining the maneuver plan comprising no discontinuous thrust maneuver is executed in parallel with the step 51 of determining the maneuver plan comprising discontinuous thrust. A maneuver plan comprising no discontinuous thrust maneuver and a maneuver plan comprising discontinuous thrust are thus determined. In the example illustrated by FIG. 4, the method 50 for control and desaturation then comprises a step 54 of evaluating a predetermined discontinuous thrust control criterion. When the discontinuous thrust control criterion is satisfied, the maneuver plan comprising discontinuous thrust is used during control step 52. When the discontinuous thrust control criterion is not satisfied, the maneuver plan comprising no discontinuous thrust maneuver is used during control step 52.

For example, the discontinuous thrust control criterion can be considered as satisfied when:

the obtained desaturation of the storage device by using the maneuver plan comprising no discontinuous thrust maneuver is considered insufficient, for example with a constant activation duration of the propulsion unit 30, 31, and/or the requirement in terms of desaturation, in particular three-axis desaturation, is such that the maneuver plan comprising no discontinuous thrust leads to excessive fuel consumption (for example greater than a predetermined threshold value) compared to the maneuver plan comprising discontinuous thrust, and/or the start dates and durations of the thrust maneuvers of the maneuver plan comprising discontinuous thrust are more compatible with the constraints of the operator of the satellite 10 than those of the maneuver plan comprising no discontinuous thrust maneuver, etc.

However, other examples of a discontinuous thrust control criterion are possible. In addition, other variants of the particular embodiment illustrated by FIG. 4 are possible. For example, one possible variant consists of first executing step 53 of determining the maneuver plan comprising no discontinuous thrust maneuver, then directly executing step 54 of evaluating the discontinuous thrust control criterion. In such case, the step 51 of determining the maneuver plan comprising no discontinuous thrust is executed only when the discontinuous thrust control criterion is satisfied.

FIGS. 5 to 8 schematically represent examples of maneuver plans with discontinuous thrust. FIGS. 5 to 8 represent the orbit of the satellite 10 around the Earth T, as well as the orbital nodes (ascending and descending nodes, opposite each other relative to the Earth T). The maneuver plans shown in FIGS. 5 to 8 are all defined over a single orbital period. However, nothing excludes having a maneuver plan defined over several orbital periods. Furthermore, the maneuver plans shown in FIGS. 5 to 8 include a first thrust maneuver executed in the vicinity of the ascending node and a second thrust maneuver executed in the vicinity of the descending node.

FIG. 5 schematically represents an example of a maneuver plan with discontinuous thrust, in which the first thrust maneuver is a discontinuous thrust maneuver composed of two thrust sub-maneuvers MP1' and MP1", and the second thrust maneuver MP2 is a continuous thrust maneuver.

In the example illustrated by FIG. 5, the thrust sub-maneuvers MP1' and MP1" are both executed at the same side of the orbital node (ascending node), in this case downstream of the orbital node relative to the direction of movement of the satellite 10 in its orbit.

In preferred embodiments, and as illustrated by FIG. 6, the thrust sub-maneuvers MP1' and MP1" are executed one on either side of the orbital node. Thrust sub-maneuver MP1' is executed upstream of the orbital node and thrust sub-maneuver MP1" is executed downstream of said orbital node. Such arrangements make it possible to improve the efficiency of the orbit control, since the two thrust sub-maneuvers MP1' and MP1" can be brought close to the orbital node.

FIG. 7 schematically represents an example of a maneuver plan with discontinuous thrust in which the first thrust maneuver is a discontinuous thrust maneuver composed of two thrust sub-maneuvers MP1' and MP1", and the second thrust maneuver is also a discontinuous thrust maneuver composed of two thrust sub-maneuvers MP2' and MP2". Indeed, the number of discontinuous thrust maneuvers can vary from one maneuver plan to another, or even from one orbital period to another, depending on the orbit control and desaturation requirements. Increasing the number of discontinuous thrust maneuvers makes it possible in particular to increase the capacity for three-axis desaturation of the maneuver plan.

FIG. 8 schematically represents an example of a maneuver plan with discontinuous thrust in which the first thrust maneuver is a discontinuous thrust maneuver composed of three thrust sub-maneuvers MP1', MP1", and MP1''', and the second thrust maneuver is a continuous thrust maneuver MP2. Indeed, the number of thrust sub-maneuvers of a discontinuous thrust maneuver can be greater than two, for example to further increase the capacity for three-axis desaturation of the discontinuous thrust maneuver.

It should be noted that the examples represented by FIGS. 5 to 8 are not limiting, and other maneuver plans are conceivable. Preferably, when the maneuver plan is defined over several orbital periods, it comprises at least one thrust maneuver per orbital period. It should be noted that the number of thrust maneuvers per orbital period may vary from one orbital period to another. For example, the maneuver plan may include one thrust maneuver during a first orbital period, then two thrust maneuvers during a second orbital period, etc. In general, a maneuver plan comprising discontinuous thrust must include at least one discontinuous thrust maneuver, and it is possible to have a maneuver plan that only includes discontinuous thrust maneuvers. If the maneuver plan is defined over several orbital periods, it is possible to have certain orbital periods during which no discontinuous thrust maneuver is executed. However, a maneuver plan comprising discontinuous thrust and is defined over several orbital periods preferably includes at least one discontinuous thrust maneuver per orbital period.

FIG. 9 schematically represents a preferred embodiment of a maneuver plan comprising discontinuous thrust. In this embodiment, the thrust sub-maneuvers of a discontinuous thrust maneuver are executed when the satellite 10 is located within an angular range P1 which is preferably at most 60°, centered on the orbital node (ascending or descending) of the discontinuous thrust maneuver. Thus, each thrust sub-maneuver begins and ends while the satellite 10 is within angular range P1, as illustrated by FIG. 9 with two thrust sub-maneuvers MP1' and MP1". Such arrangements make it possible to improve the efficiency of the orbit control, since no thrust sub-maneuver is executed when the satellite 10 is in a position that is too far from the orbital node. Even more preferably, the thrust sub-maneuvers of the discontinuous thrust maneuver are executed when the satellite 10 is located within an angular range of at most 50° centered on the orbital node.

More generally, it should be noted that the modes of implementation and the embodiments considered above have been described as non-limiting examples, and that other variants are therefore possible.

In particular, the invention has been described while primarily considering a satellite 10 comprising two articulated arms 20, 21 each comprising three joints. However, in other examples nothing excludes considering a satellite 10 comprising a number of articulated arms that is greater than two, and/or comprising a number of joints and/or degrees of freedom that is greater than three.

The invention claimed is:

1. A method for orbit control of a satellite in orbit around the Earth and for desaturation of an angular momentum storage device of said satellite, said satellite comprising two articulated arms each having at least three degrees of freedom and each supporting a propulsion unit, the orbit of the satellite comprising two opposite orbital nodes, said method comprising:

determining a maneuver plan for controlling the orbit of the satellite and for desaturating the storage device, said maneuver plan comprising at least two thrust maneuvers, a first thrust maneuver to be executed using the propulsion unit of one of the articulated arms when the satellite is located near one of the orbital nodes, a second thrust maneuver to be executed using the propulsion unit of the other articulated arm when the satellite is located near the other orbital node, controlling the articulated arms and the propulsion units according to the maneuver plan, wherein at least one of said first and second thrust maneuvers is a discontinuous thrust maneuver, said discontinuous thrust maneuver being composed of at least two separate consecutive thrust sub-maneuvers.

2. The method according to claim 1, wherein the maneuver plan comprises a continuous thrust control mode, and a discontinuous thrust control mode, wherein the discontinuous thrust control mode is used when a predetermined discontinuous thrust control criterion is satisfied.

3. The method according to claim 2, wherein the discontinuous thrust control criterion is dependent on a requirement in terms of desaturation of the storage device.

4. The method according to claim 3, wherein the discontinuous thrust control criterion is satisfied when the requirement in terms of desaturation is such that a maneuver plan comprising no discontinuous thrust would lead to excess fuel consumption exceeding a predetermined threshold value, in comparison to a maneuver plan comprising a discontinuous thrust.

5. The method according to claim 1, wherein the discontinuous thrust maneuver comprises at least an upstream thrust sub-maneuver, to be executed upstream of said orbital node, and a downstream thrust sub-maneuver, to be executed downstream of said orbital node.

6. The method according to claim 1, wherein, in a satellite's frame of reference, the thrust direction of the thrust force applied by the propulsion unit at the end of a thrust sub-maneuver is substantially identical to the thrust direction of the thrust force applied by said propulsion unit at the start of the next thrust sub-maneuver.

7. The method according to claim 1, wherein, the articulated arms used to execute the discontinuous thrust maneuver comprise at least three joints each having at least one degree of freedom in rotation about an axis of rotation, the respective angular positions of said at least three joints are not modified between two consecutive thrust sub-maneuvers of a same discontinuous thrust maneuver.

8. The method according to claim 1, wherein the first thrust maneuver and the second thrust maneuver have initial thrust forces of the propulsion units that are in respective non-parallel thrust directions in an inertial frame of reference, said thrust forces being determined so as to create torques in respective non-parallel planes in the inertial frame of reference and to carry out three-axis desaturation of said angular momentum storage device.

9. The method according to claim 1, wherein the first thrust maneuver and the second thrust maneuver have thrust forces of the propulsion units that are determined so as to control at least the inclination of the orbit of the satellite.

10. A satellite intended to be placed in orbit around the Earth, comprising two articulated arms each having at least three degrees of freedom and each supporting a propulsion unit, wherein said satellite comprises a control device configured to control the articulated arms and the propulsion units supported by said articulated arms according to a maneuver plan of a method for orbit control and desaturation according to claim 1.

11. The satellite according to claim 10, wherein each articulated arm comprises at least three joints each having at least one degree of freedom in rotation about an axis of rotation, a first joint and a second joint being separated by a first connecting member and having non-parallel respective axes of rotation, the second joint and a third joint being separated by a second connecting member and having non-parallel respective axes of rotation.

12. The satellite according to claim 10, further comprising electric thrusters.

13. A satellite system comprising a ground station and a satellite in orbit around the Earth according to claim 10, wherein the maneuver plan is determined by the control device and/or by the ground station.

14. The satellite system according to claim 13, wherein the satellite is in geostationary orbit.

* * * * *